Patented July 8, 1924.

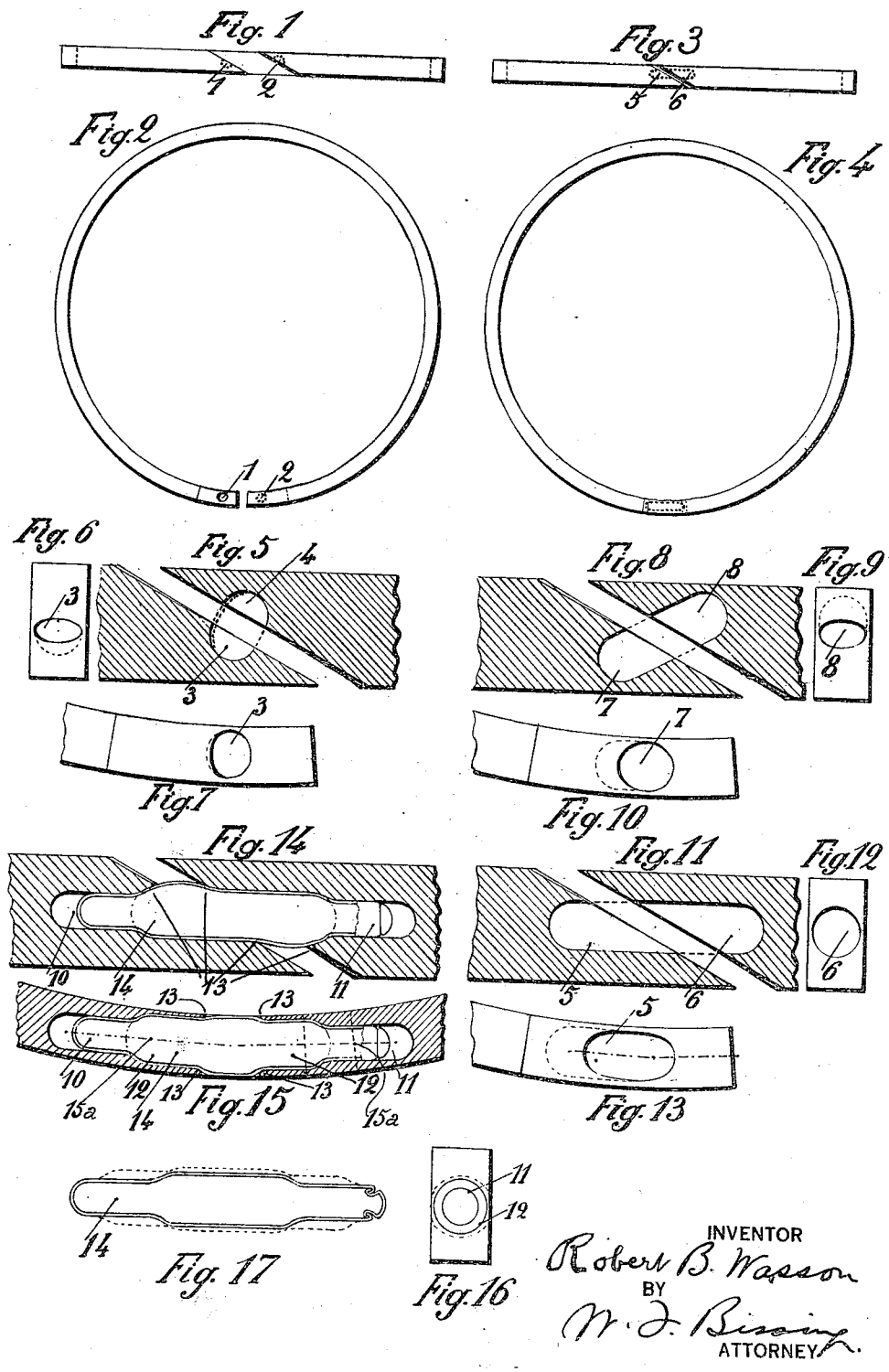

1,500,693

UNITED STATES PATENT OFFICE.

ROBERT BINGHAM WASSON, OF CRANFORD, NEW JERSEY.

PISTON-RING JOINT.

Application filed May 23, 1923. Serial No. 640,887.

*To all whom it may concern:*

Be it known that I, ROBERT BINGHAM WASSON, a citizen of the United States, residing at 306 Elizabeth Avenue, Cranford, New Jersey, have invented certain new and useful Improvements in Piston-Ring Joints, of which the following is a specification.

This invention relates to an improvement in joints for piston rings and more particularly to a joint packing for piston rings which will expand when the ring is in place and in use, so as to permit the ring to always press against the inside face of the cylinder.

One of the objects of the invention is to provide a joint for the ring having a stopper between its ends the stopper being made of an expandible packing material or being constructed to expand so as to follow up and press open the ring while the ring is wearing.

With the above and other objects in view my invention consists in the parts, improvements and combinations more fully pointed out hereinafter.

As is well known piston rings are utilized for preventing gas, oil, steam or other fluid from passing from one side to the other of the piston of the engine. These rings consist of metallic split rings made in the form of annular springs split at a point of their circumference and placed in grooves in the pistons. The split is frequently made on the bias. When the ring is off the piston, i. e., when it is free to expand, the ends of the split are relatively far apart and the maximum diameter of the ring is more than that of the cylinder. When the ring is put in place on the piston and the piston is placed within the cylinder, the edges of the split are close together and the ring takes the form of the cylinder. Its outside diameter is that of the cylinder. The ring may be hammered or condensed so that it will exert a uniform force upon the cylinder at all parts of its circumference.

Such a ring when wearing, as it does in operation, opens more and more. It remains in contact with the surface of the cylinder. But the split portion or gap opens more and more and the leakage, therefore, at the split portion, increases. One of the objects of the invention is to suppress any leakage through the split or gap whether the clearance or gap at the split portion be slight or great.

In accordance with the invention recesses are provided in the ends at the split and into these recesses a stopper is placed which will swell or expand until the stopper firmly contacts with the cylinder wall at the split, this surface of contact taking place when the ring is put in place and also remaining and increasing when the ring wears and the split widens, by following up such wear with further expansion.

Referring to the drawings which illustrate several embodiments of the invention:

Figs. 1 and 2 illustrate a side view and a top view of a ring, which is shown of uniform cross-section, before placing the ring in the cylinder. The ring is in its free state with ends separated.

Figs. 3 and 4 illustrate a side view and a top view of a ring, but provided with the improvement and after the ring has been placed in the cylinder, the ring being supposed to have undergone some wear.

Figs. 5, 6 and 7 illustrate in section and in elevation the ends of a ring illustrated in Fig. 1, provided with hemispherical cavities to receive the packing forming the joint.

Figs. 8, 9 and 10 illustrate, in section and in elevation, the ends of the ring shown in Fig. 3, provided with elongated cavities for receiving the packing of the joint.

Figs. 11, 12 and 13 show the ends of the ring in which the cavities run horizontally or in the direction of the circumference of the ring.

Figs. 14, 15 and 16 show another embodiment of the invention in which the cavities in the ring ends are provided with a capsule containing gas under pressure.

Fig. 17 is an elevation of the capsule, the dotted line indicating one of its conditions.

In the construction shown in Figs. 1 to 13, fibrous fillings are made use of. These may take the form of spherical plugs or stoppers, located in semi-spherical recesses 1 and 2; or ellipsoidal plugs of elliptical cross-sections located in elliptical recesses 3, 4, as in Figs. 5, 6 and 7; or they may take the form of a cylinder with rounded ends, located in corresponding recesses 5, 6, 7 and 8, as in Figs. 8 to 13. The spherical and ellipsoidal forms are utilized where the ring wears and where the ends separate very little from the normal position. The cavities in the ends are made hollow and are dimensioned or proportioned for the mean position of the ring. The cylindrical form of packing stopper is utilized in a case where the rings wear rapidly and to a large extent. In this form the ends carrying the two cavities may separate to a large degree without danger of cutting the packing. In Figs. 3 and 4 and Figs. 8, 9 and 10, the axes of the cylindrical recesses are inclined to the side faces of the ring and in Figs. 11, 12 and 13, the axes of the recesses are parallel to the side face of the ring.

The material of which the packing is formed will vary according to conditions. If the temperature is not too high and if the lubrication is ample, which is frequently the case, for example where the oil is not burned, packing consisting of Indian cotton-wool may be utilized. This material expands greatly when in contact with liquid, such as water, condensed steam or oil.

If higher temperatures are utilized, which might carbonize the Indian cotton-wool, the packing consists of a fibrous material, more or less rich in mineral substance. If the temperature is still higher asbestos is made use of for the packing.

In these forms the packing swells by absorbing the liquid and also because the pressure of the fluid forcing its way into the gap between the points of the ring presses upon the material of the packing and spreads it until it forms a tight closure or joint with the wall of the cylinder.

When utilizing high temperatures the cavities in the ring ends take the form shown in Figs. 14, 15 and 16. Each cavity is composed of a cylindrical part 10, 11 which is quite long and of relatively small diameter so as not to weaken the end. This cavity is prolonged near the face of the end by a portion of larger diameter 12, finishing in a rounded opening 13. In this form the two cavities are almost completely filled when the ring is in place in the cylinder by a little metallic capsule 14, which has the diameter fitting the parts 10, 11 and 12. This capsule is filled with a liquid or gas under pressure, which may be liquid carbonic acid. The metal of the capsule may be made of bronze alloy, its thickness depending on the nature of the metal. The maximum diameter and the pressure within the capsule which develop from the operation of the engine raising the temperature of the fluid in the capsule to its maximum, are such that the capsule must not open but must swell at its sides where the capsule walls are not supported by the walls of the cavities in the points of the ring. The capsule will fill the recesses 13, and the spaces between the points. The metal of the capsule will thus form a joint with the wall of the cylinder, in the clearance space between the ends.

When the clearance widens and the ends separate by reason of the wear of the ring, the capsule which is always supported by part of the cylindrical walls of the cavities 11 and 12 expands in its middle and lengthens somewhat. It is to be noted that when the cylindrical cavities of the segment are made their axes are inclined somewhat with reference to the tangent line 15$^a$.

Fig. 17, represents in full line the capsule in its form before it is placed into the ends and in dotted line the form which it takes in operation after the ring has become slightly worn.

Having thus described the invention, its operation will be clear. It is to be understood that changes may be made without departing from the principle of the invention.

What I claim is:

1. A split piston ring constructed to exert radial outward pressure, the ends of the ring provided with recesses, in combination with an expandible stopper, having portions within said recesses, the expansion of the stopper sealing the gap of the ring.

2. A split piston ring constructed to exert radial outward pressure, the ends of the ring provided with recesses, in combination with an expandible stopper, having portions within said recesses, said stopper consisting of fibrous material.

3. A split piston ring constructed to exert radial outward pressure, the ends of the ring provided with recesses, in combination with an expandible stopper, having portions within said recesses, said stopper consisting of a fibrous material containing asbestos.

4. A split piston ring constructed to exert radial outward pressure, in combination with an expandible stopper arranged between the ring ends and means for securing the stopper to the ends of the ring, the expansion of the stopper sealing the gap of the ring.

In testimony whereof, I have signed my name to this specification.

ROBERT BINGHAM WASSON.